Jan. 13, 1959   F. L. SHEA, JR   2,868,695
PROCESS FOR PREPARING A CARBONACEOUS MATERIAL
Filed April 18, 1955
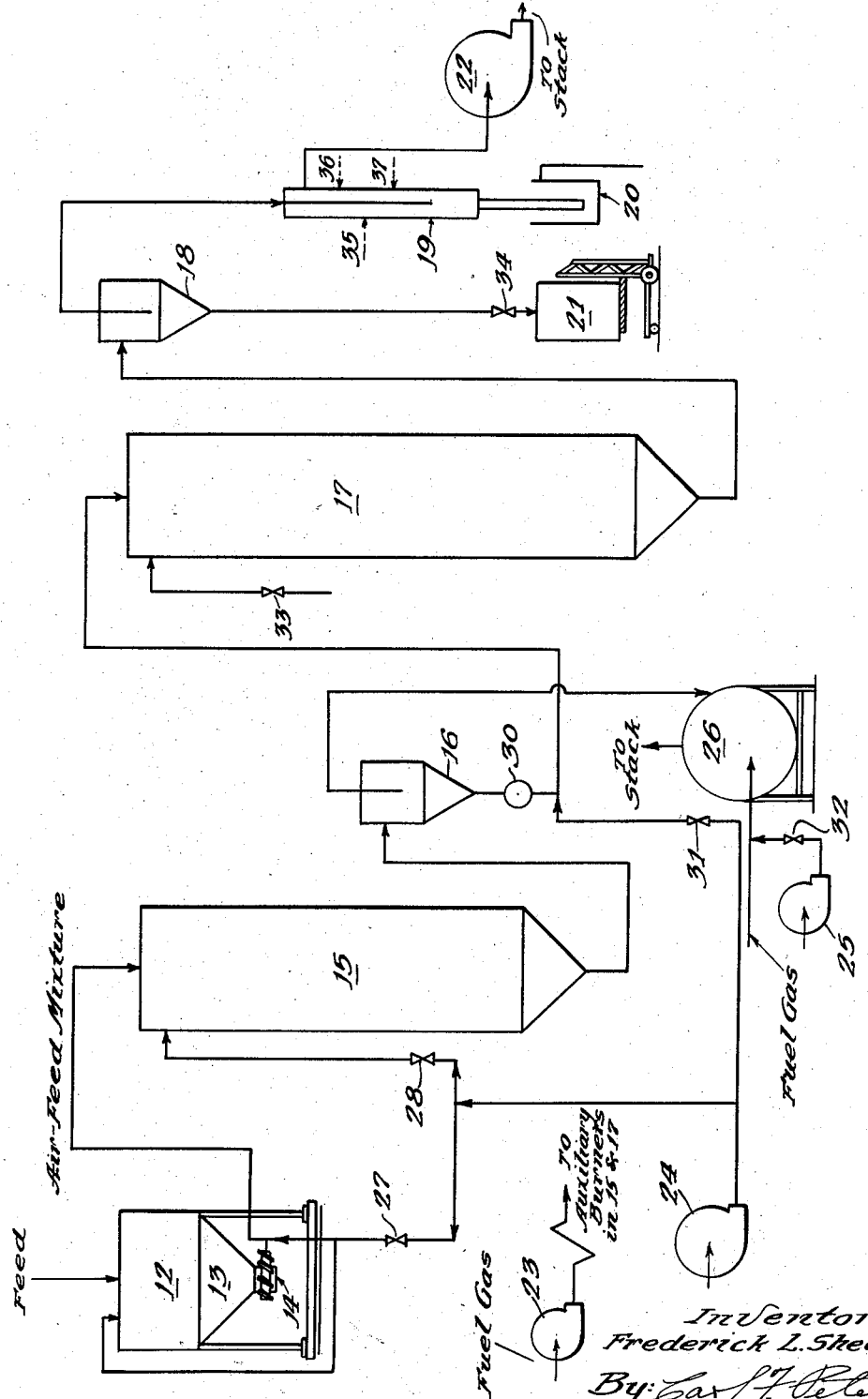
Inventor:
Frederick L. Shea, Jr.
By: Carl F. Peters
Attorney

2,868,695

PROCESS FOR PREPARING A CARBONACEOUS MATERIAL

Frederick L. Shea, Jr., Arlington Heights, Ill., assignor to Great Lakes Carbon Corporation, New York, N. Y., a corporation of Delaware Application April 18, 1955, Serial No. 502,122

9 Claims. (Cl. 202—9)

This invention relates to a novel process for the preparation of a carbonaceous product by heat treatment of a solid, bituminous material. More particularly, this invention relates to a process for preparing a carbonaceous product suitable as a filteraid by heat treatment of a bituminous material normally solid at ordinary temperatures and capable of expanding on heating to plasticity.

The most commonly used filteraid in the filtration of water and industrial liquids for the removal of finely divided colloidal and mucilaginous suspensoids involves the use of specially prepared diatomaceous earth filteraids. These are selected from particular diatom strata and their manufacture usually involves calcination at an elevated temperature with or without a fluxing agent. Diatomaceous filteraids are to be contrasted with such agents as sand, pumice, gravel, etc. which merely effect a rough straining of the liquid leaving colloidal particles suspended in the filtrate and which cannot be classed as true filteraids. Filtration with diatomaceous earth filteraids is usually carried out by admixing small proportions of the powdered agent with the liquid and filtering the liquid through a medium (screen, cloth or other readily permeable support) on which the filteraid and entrained suspensoids are retained while the clear liquid passes through. Alternatively, or in conjunction with the practice just described, a precoat of filteraid may be built up on a filtration apparatus (rotary or plate and frame filter process) and liquid passed through it to remove the suspended matter.

Up to the present time the filtration of an alkaline liquid with diatomaceous earth, especially at high temperatures, has been difficult and often impossible. This is due to the rapid rate of solution of diatomaceous silica in the alkaline liquid accompanied by an adverse result upon the structure of the filteraid with attendant reduction in flow rate. Where the suspended matter in such liquids is of large particle size, resort has been had to ground, washed anthracite fines which are only about as effective as regular sand filters. In the event that the suspended matter is of finer particle size, use has been made of certain chars recovered from the dehydration and oxidation of "black liquors," a by-product of paper manufacture. This liquid is evaporated to recover soda ash by spraying it into a kiln internally heated by combustion of solid fuels. A charred product results from which the inorganic soluble chemicals are recovered by leaching with water, leaving an insoluble char which is reasonably low in ash. Since this is classified as a by-product it varies in quality and is also characterized by a fairly high degree of activation and friability. The latter property is considered to be objectionable since the particles degrade or break down readily during handling and also due to the mechanical action of the filtration apparatus. The increased amount of fines in the product sharply reduces filtration rates thereby slowing down other depending plant operations.

It is an object of the invention to provide a process for producing a carbonaceous material capable of removing finely divided colloidal and mucilaginous suspensoids when employed as a filteraid in the filtration of water and industrial liquids.

It is a further object of the invention to provide a process for preparing a carbonaceous material suitable as a filteraid in the filtration of highly alkaline liquids, particularly where absorption or solution of silica in the clarified liquor would be harmful or objectionable in subsequent operations involving the clarified liquid.

It is a further object of the invention to provide a process for preparing a carbonaceous material of a special type from normally solid bituminous material.

It is a further object of the invention to provide a process for preparing a uniform carbonaceous material which is granular, hard, and improved in friability resistance.

The above objects as well as others which will become apparent upon an understanding of the invention as herein described are accomplished by flash-calcining in a gaseous atmosphere containing a limited and controlled amount of oxygen, a finely divided bituminous feed material normally solid at ordinary temperatures and capable of expanding on heating to plasticity; followed by separating the resulting solid particle material from the gaseous products, and finally heating the separated particles to remove volatile matter remaining on the surfaces of the particles.

The term "flash-calcination" (first stage reaction) as used herein and in the appended claims may be defined as a method whereby finely divided particles of a suitable bituminous material are subjected to a very rapid upheat rate, estimated to be in excess of 2000° F. (particle surface temperature) per second, in a reactor maintained at a temperature of 1150° F. or higher, but sufficient to ignite the particles. This rapid upheat of the particles is conducted in the presence of air or other oxygen-containing gas (or oxidizing gas) the oxygen being present in an amount such that at least 10% of the evolved combustible volatile matter remains unburned. The amount of air or oxygen present is sufficient to make the process self-sustaining while permitting expansion of the individual bituminous particles at a rapid rate but is insufficient to permit more than a minimum burning of the individual expanded first-stage product particles. In general, it has been observed that higher temperatures may be tolerated when larger particle feed sizes are used.

In a broad embodiment of the invention, finely divided bituminous feed material which is normally solid at ordinary temperatures and which is capable of expanding on heating to plasticity, is processed in three stages. In the first stage, the feed material is flash-calcined in a gaseous atmosphere containing oxygen in an amount such that at least 10% of the evolved combustible volatile matter remains unburned.

In the second stage of the process the resulting expanded particles are separated from gaseous and vaporous products at a temperature not less than that at which substantially all of the vaporous products of the first stage remain in the vaporous state. This temperature will vary with the type of feed material employed and is intended to be high enough to minimize condensation of the vapors on the expanded particles.

In the third stage, the separated expanded particles are given a further heat treatment to remove sufficient volatile matter remaining or condensed on the surfaces of the particles to render them wettable, the term "wettable" being defined in a subsequent part of this description. This heat treatment may consist of heating the particles in contact with oxidizing gases at a temperature sufficiently high to burn off the volatile matter remaining on the surfaces of the particles or it may consist of contacting the particles with a stream of inert gases, such as flue gas, at a temperature sufficiently high to distill off the volatile matter remaining on the surfaces of the particles.

The bulk density of the final product should be maintained at a value of less than 25 lbs./cu. ft. We have found that the type of product desired can best be produced where the flash-calcining temperature in the first stage is maintained at no less than about 1150° F. and no more than about 2000° F., the optimum temperature varying with the feed size and type of bituminous material used. Employment of too low a temperature will result in an insufficiently expanded product. Use of too high a temperature will result in undue shrinkage or collapse of the particles and a consequent excessively high bulk density of the product.

Control of the temperature of heat treatment in the first stage is accomplished by regulating the oxygen intake. It has been found that the required amount of oxygen in standard cu. ft./lb. of bituminous material is between about 2.0 and 4.0 when unheated air is used as the source of oxygen. Lesser amounts of oxygen can, of course, be used if either the feed or the air or oxygen intake are preheated or if the source of oxygen be relatively pure oxygen or oxygen enriched air, etc. In any event, the oxygen should be present only in such an amount that at least 10% of the evolved combustible volatile matter remains unburned. This unburned volatile matter is largely separated from the expanded particles in the second stage separator from which it is conveyed to some disposal point such as combustion chamber 26 illustrated in the drawing. By thus limiting the burning of evolved combustible volatile matter in the first stage, reactor temperatures can be maintained sufficiently low (2000° F. or lower), to avoid the aforementioned shrinkage or collapse of the bituminous particles.

The expanded particles obtained from the first stage will not be wettable, but in the third stage the proper heat treatment is supplied to achieve wettability. This is an important feature of the invention which further distinguishes it from the prior art. The three stage method of this invention results in substantially higher yields and quality than could be achieved in, for example, a single stage process in which both expansion and wettability would be sought in the one stage. The process of this invention makes possible controlled expansion of the particles in the first stage and controlled heating in the third stage to obtain the desired wettability.

While it is preferable that the source of heat used in each of the stages be the particle itself, it is conceivable and within the contemplation of this invention that a substantial portion of the heat may be supplied by some outside source or auxiliary fuel. The most rapid upheat rates are, of course, obtained using the particle itself as the source of heat.

The raw material employed in this novel process may be any finely divided bituminous material normally solid at ordinary temperatures and capable of expanding on heating to plasticity. By the latter is meant the ability of the material to soften when heated through the plastic state and swell if the volatile matter of each particle is driven off at a sufficiently high rate. Examples of such materials include both low volatile and high volatile bituminous coals, raw coal tar pitch coke, and coal tar pitch fortified with any of the various thermal blacks or carbon blacks. In any event the processing history of the raw material selected must not include any heating at a temperature high enough to result in a permanently set carbonaceous structure. Any raw material subjected to such temperature will not expand satisfactorily on heating to plasticity under the conditions disclosed herein.

In preparing the bituminous material described above for the first stage flash-calcination operation, the material must be suitably ground or milled to produce finely divided particles. This involves the use of a Raymond hammer mill, Babcock and Wilcox ring roller or other appropriate pulverizing apparatus which will reduce the bituminous material to a particle size of about 95% —100 mesh and preferably about 75 to 95% —200 mesh. It has been found that the latter size of feed is to be preferred in order to produce from coal a final carbonaceous filteraid which will have a particle size falling within the range of 5 to 140 microns, very little of the product falling outside of this range. I also contemplate under certain circumstances the milling and classification (by either dry or wet methods) of the bituminous feed.

If the liquid to be filtered with the carbonaceous filteraid, whose process of manufacture is described herein, is sufficiently neutral or has a pH within the range of 6 to 8, the ash content of the filteraid product is not of prime importance and it will not be necessary to select a raw material having a particularly low ash content. However, as previously stated, the carbonaceous filteraid is particularly well suited for the filtration of highly alkaline systems, wherein the pH will be greater than 10 and often 12 to 13. In such cases it will often be essential that the ash content of the carbonaceous filteraid produced be controlled as to composition and amount by selection of the raw material to avoid solution of silica, iron or other deleterious materials. In general, we have found that a bituminous material having an ash content of up to 7%, and depending also on the volatile matter content, produces a satisfactory filteraid for alkaline systems.

In preparing carbonaceous filteraids by the process described herein, I have found that particularly beneficial results are to be obtained by maintaining the moisture content of the raw material at a value of less than 5% by weight. Excess moisture in the bituminous material fed to the unit in which the flash-calcination is conducted necessitates vaporization of the water to a temperature above 1150° F., or whatever reactor temperature used, which sharply reduces the rate of temperature rise of the bituminous particles. Often this must be done by burning additional fuel in the unit since excess moisture in the particles reduces the temperature of the operation to a point where the desired results are not obtained.

The carbonaceous filteraid, whose process of manufacture is described herein, may have a very narrow particle size distribution depending upon the requirements of the liquid which is to be filtered. For example, a product may consist of particles whose size is less than 100 mesh and not more than 25% —10 microns; or the product may consist of particles whose size is graduated and falls essentially within the range of 5 to 70 microns. Proper particle size distribution may be obtained by air classification of either or both the feed material and the product of any stage employing means known to those skilled in the art of preparing diatomaceous earth filteraids; the product may also be wet classified. Both of these operations are designed to restrict upper and lower limits with respect to the size of the particles.

A usually essential characteristic of a carbonaceous filteraid is that it be substantially completely wettable in the liquid which is to be filtered. This is readily determined by placing a small quantity of the filteraid product in a sample of the liquid and agitating the liquid vigorously. If the product is readily dispersed and suspended in the liquid it is said to be "wettable."

A further requirement of the carbonaceous filteraid product produced by the process of my invention is that it have a bulk density of less than 25 lbs./cu. ft. and preferably within the range of 5 to 20 lbs./cu. ft. Bulk density values are determined by permitting the product to fall freely into a graduated cylinder and measuring the loose-settled volume of a given weight of the product.

In addition to the foregoing definitions, the following will be useful in describing carbonaceous filteraids produced by the process of my invention:

The "volatile content" of the coal and carbonaceous filteraid product, exclusive of water, is determined by a procedure which is a modification of ASTM Procedure No. D271-48. A small sample of the coal or final filteraid product is heated to 950° C. for five to ten minutes, the difference in weight between the sample and the final product being defined as "volatile content."

The "cake density" of a filteraid is measured by suspending the filteraid in water and passing the suspension through a screen or cloth filter which will render it filtered. The "cake density" (lbs. per cubic foot) is calculated from the volume and dry weight of the resulting filter cake.

The "flow ratio" and "clarifying power" of the filtered product is obtained relative to a standard diatomaceous earth filteraid such as "Dicalite Speedplus" which is a high-grade, free-flowing material extensively used in the clarification of raw sugar solutions. Such a solution is employed as a standard in numerous industries which have filtration problems as a check against the properties or clarifying power of the filteraid.

In a preferred embodiment of my invention, finely divided bituminous coal having a volatile content of between about 15% and about 20%, is flash-calcined by entraining in an air stream and feeding it into the top of a vertical reactor. Secondary air is supplied to the reactor to give a total oxygen content of between 2.2 and about 3.5 standard cu. ft./lb. of coal and to produce a reactor temperature between about 1350° and about 1650° F. The expanded solid product of this first stage is then separated from the gaseous products in a cyclone collector operated at a temperature not less than that at which substantially all of the vaporous products remain in the vaporous state. In the third stage, the separated particles are conveyed into the top of a second vertical reactor. Secondary air is supplied to this reactor to produce a temperature sufficiently high to burn off residual volatile matter remaining on the surfaces of the particles.

The foregoing preferred embodiment is illustrated in the accompanying drawing in which the finely divided bituminous coal is fed into the top of pressurized feed hopper 12 having an agitator 13 (rotating shaft with radial spikes) and screw feeder 14. The coal feed from screw feeder 14 is entrained in an air stream and carried to the top of a first stage reactor 15 into which it is injected preferably through a water cooled nozzle (not shown). Secondary air is added to reactor 15 at a position near the top of the reactor. Temperatures within this reactor are preferably between 1350° and 1650° F. Blower 24 is employed to supply both the primary and secondary air streams through valves 27 and 28, respectively. The entrained product particles of reactor 15 are carried from the bottom of the reactor to cyclone 16 along with gaseous and vaporous products, where their separation is effected. The gaseous and vaporous products are removed from the top of cyclone 16 and passed into combustion chamber 26 where they are burned prior to escape through a stack. Air supplied by blower 25 and controlled by valve 32 along with fuel gas is injected into the combustion burner to effect the burning of the gases. Blower 23 is employed prior to normal operation of the plant to supply fuel gas to auxilliary burners in 15 and 17 which bring the reactors up to operating temperatures.

The product of the second stage operation (cyclone 16) is removed through seal valve 30 and carried by an air stream supplied by blower 24 through valve 31 to the top of reactor 17. Seal valve 30 is necessary since reactor 15 and cyclone 16 are maintained under positive pressure whereas reactor 17 is maintained at a negative pressure by blower 22 operating as an exhauster.

Secondary air is bled into reactor 17 through valve 33 in sufficient quantity to maintain the reactor temperature at about 1300° to about 2300° F. The product of reactor 17 (third stage operation) is removed from the bottom of reactor 17 and carried to collector cyclone 18. Gaseous products from reactor 17 are carried from the top of cyclone 18 to scrubber 19 having water sprays 35, 36, and 37. Sludge from scrubber 19 is deposited in sludge pot 20 from which it may be conveniently removed. The final filteraid product passes from the bottom of cyclone 18 through valve 34 into a drum 21.

The residence time of the bituminous particles in the reactors 15 and 17 will depend upon the size and volatile content of the particles, the reactor temperatures and dimensions, feed rates, and the ratio of oxygen to bituminous particles. In a typical installation, reactors 15 and 17 will both have dimensions of 20 ft. in length and inside diameter of 5 ft. In such a case, a particularly useful residence time in the reactors for medium volatile coal particles (75% —200 mesh particle size) is from 3 to 30 seconds, or a particle velocity of from about 7 to 0.7 ft./second.

In order to further illustrate the invention, but with no intention of being limited thereby, the following examples are set forth in which various forms of solid bituminous materials were preliminarily ground to suitable particle size, with controlled moisture content, after which the comminuted material was processed in apparatus of the type illustrated in the drawing.

The percent ash and bulk density or cake density of the resulting products were determined in accordance with the procedures previously mentioned herein. The flow ratio values of the products were determined with a 60° Brix aqueous raw sugar solution at 80° C. The flow ratio figures indicate the relative performance (rate of flow of liquid through the filter cake) of the carbonaceous filteraids as compared to a standard grade diatomaceous earth filtered. The procedure for determining flow ratio is as follows:

To the raw sugar solution is added 0.3% by weight of carbonaceous filteraid based upon the solids content of the sugar solution. The resulting liquor is passed through a one inch diameter filter for a twenty-one minute period, the pressure on the system being uniformly raised from 10 up to 40 p. s. i. at three minute intervals (10 p. s. i. each) during the first nine minutes of the test. The values are relative with respect to a high quality, free-flowing diatomaceous earth filteraid of the type known as "Dicalite Speedplus" which is widely used in the filtration of sugar solutions. Favorable flow rate values for carbonaceous filteraids in comparison to this type of diatomaceous earth filteraid permits a prediction of the performance of the former product on other systems which are normally difficult to filter.

The filtrate obtained in the above determination of flow ratio (except for that obtained during the first three minutes which is discarded) is tested optically for "transmission clarity" which is a measure of the "clarifying power" of the filteraid. The values given in the examples following are relative to Dicalite Speedplus arbitrarily given the value of 100.

*Example No. 1*

A sample of Lillybrook No. 3 mine bituminous coal having a volatile content of 17% and ash content of 4.3% was milled to 75% —200 mesh. The first stage reactor 15 was preheated to a temperature of 1410° F. by burning gas supplied by gas pump 23 to auxiliary burners in the reactor. A stream of the coal was then fed into reactor 15 at a particle velocity of 1.5 ft./second and processing carried out as described in the preferred embodiment above. The feed rate was 135 lbs./hour. The maximum temperature in the first stage (reactor 15) was 1562° F. The minimum temperature in the second stage (cyclone 16) was 810° F. The maximum temperature in the third stage (reactor 17) was 1960° F. A satisfactory filteraid product was obtained in a yield of 50.1% based on the dry weight of feed to the first stage. The product had an ash content of 9.23% by weight, a cake density of 15.9 lbs./cu. ft., a flow ratio of 173, and a transmission clarity of 44.

*Example No. 2*

An identical sample of milled coal and the same processing apparatus as were used in Example No. 1 were employed with slightly different reactor conditions. The feed rate was 161 lbs./hour. The maximum temperature in the first stage was 1605° F., the minimum temperature in the second stage was 815° F., and the maximum temperature in the third stage was 2025° F. A satisfactory filteraid was obtained in a yield of 58.0%, having an ash content of 7.88% by weight, a cake density of 17.1 lbs./cu. ft., a flow ratio of 186, and transmission clarity of 44.

*Example No. 3*

A sample of Red Jacket bituminous coal having a volatile content of 22% and a feed size of 75% −200 mesh was processed as described in Example 1 using a feed rate of 131 lbs./hour, a first stage reactor maximum temperature of 1492° F., and a third stage reactor maximum temperature of 2025° F. A 42% yield was obtained having as ash content of 5.80% by weight, a cake density of 12.3 lbs./cu. ft., a flow ratio of 198, and a transmission clarity of 29.

*Example No. 4*

A simple of Ditney Hill bituminous coal having a volatile content of 36% and a feed size of 63% −200 mesh was processed as described in Example 1 using a feed rate of 155 lbs./hour. The maximum reactor temperatures were 1639° F. in the first stage and 2217° F. in the third stage. A satisfactory filteraid was obtained in a yield of 30.6% having an ash content of 10.11% by weight, a cake density of 14.9 lbs./cu. ft., a flow ratio of 191 and a transmission clarity of 38.

*Example No. 5*

A sample of Lillybrook No. 3 mine coal, milled to 75–79% −200 mesh, was processed as described in Example No. 1 above. The feed rate was 138 lbs./hour. The maximum reactor temperature in the first stage was 1693° F. The air to coal ratio was 19.3 cu. ft./lb. of coal. A satisfactory filteraid having a bulk density of 18.5 was obtained in a yield of 70%.

*Example No. 6*

A sample identical to that used in Example No. 5 above was processed in the same manner except that the feed rate was 124 lbs./hour and the maximum first stage reactor temperature was 1472° F. The air to coal ratio was 17.8 cu. ft./lb. of coal. A 69% yield was obtained of a good filteraid having a bulk density of 13.5.

*Example No. 7*

A sample identical to that used in Example No. 5 above was similarly processed except that the feed rate was 125 lbs./hour and the maximum reactor temperature in the first stage was 1454° F. The air to coal ratio was 17.8 cu. ft./lb. coal. An excellent yield of 83% was obtained of an excellent filteraid having a bulk density of 12.5.

*Example No. 8*

A sample of Williams bituminous coal, seam No. 6 having a volatile content of 37% by weight and ash content of 3%, was milled to 49% −200 mesh and processed similarly to Example No. 1. The first stage reactor temperature was 1460° F. However, instead of passing to the third stage vertical reactor, the particles from cyclone 10 were calcined in a moving bed in an oxidizing atmosphere for ten minutes at 1500° F. An excellent wettable filteraid was obtained in a yield of 37.0%. The bulk density of the product was extremely low, being 7.0. The flow ratio was 135 and the transmission clarity 69.

The above described carbonaceous filteraids were found to be suitable for the filtration of alkaline lignin or sodium aluminate solutions, the latter produced by the refining of bauxite. In these cases a minimum of silica pickup from the carbonaceous filteraid has been observed. In all cases the flow rate and clarity properties satisfied the requirements of commercial production.

For a complete understanding of my invention it is pointed out that the reactor temperatures set forth in the various embodiments of my invention are the apparent atmospheric temperatures, rather than particle temperatures, and are measured by means of thermocouples inserted into the interior of the reactors through ceramic sealed wells in the reactor walls.

It is also to be understood that bituminous materials other than those described in the foregoing examples may be used to produce carbonaceous filteraids by my invention, provided that these materials are capable of expanding on heating to plasticity. Also other conventional types of reactor units may be employed as long as they provide the temperature and atmospheric conditions specified in the broad embodiment set forth above. For example, alternative to the vertical reactor 17 described in Figure 1, one may employ a thermal fluidizing unit, an externally fired rotary kiln, or a multiple-hearth furnace of the type known as the Herrschoff furnace in which the coal particles are passed progressively down through the unit while being subjected to a stream of hot gases. It is also to be understood that the carbonaceous filteraids produced by the method described herein may be classified (or milled and classified) by dry or wet methods in order to regulate the flow rate characteristics, particle size, and particle size distribution in accordance with the requirements of the liquid to be filtered. In general, a reasonable percentage of −10 micron particles will provide improved clarification where this is necessary; a minimum of −10 micron particles will greatly improve the flow rate properties of the product where clarity of the final solution is not of prime importance.

It is also to be understood that I do not intend to limit the uses of the products of my invention to such as filteraids. The carbonaceous material produced by my novel process may very well meet specifications for other uses such as, for example, use as absorbent carbon material employed in liquid oxygen exposives.

Having thus described the nature of my invention and the uses for the product of my invention, but being limited only by the appended claims with respect to the scope of the invention, I claim:

1. A three-stage process for preparing a carbonaceous material from finely divided bituminous particles having a particle size of 75% −100 mesh and which are normally solid at ordinary temperatures and capable of becoming plastic and expanding on heating which comprises, in the first-stage, flash-calcining the particles at a temperature between about 1150° to about 2000° F. in a gas stream containing oxygen in an amount between about 2.0 and about 4.0 standard cu. ft./lb. of bituminous particles so that at least 10% of the evolved combustible volatile matter remains unburned, the particles being heated at a rate in excess of 2000° F. (particle surface temperatures) per second; in the second stage, separating the solid expanded first-stage product from vaporous products at a temperature not less than that at which substantially all of said vaporous products remain in the vaporous state; and in the third stage, heating the solid particles from the second stage to remove residual volatile matter remaining on the surfaces of the particles to render them wettable, the final expanded product having a bulk density of less than about 25 lbs./cu. ft.

2. A process according to claim 1 wherein, in the third stage, the solid particles from the second-stage are conveyed in and by a gas stream containing oxygen in sufficient amount to burn substantially all of the residual volatile matter remaining on the surfaces of the particles.

3. A three-stage process for preparing a carbonaceous material from finely divided bituminous coal particles having a particle size of 75% −100 mesh and which are normally solid at ordinary temperatures and capable of becoming plastic and expanding on heating which comprises, in the first-stage, flash-calcining the particles at a temperature between about 1150° to about 2000° F. in a gas stream containing oxygen in an amount between about 2.0 and about 4.0 standard cu. ft./lb. of bituminous particles so that at least 10% of the evolved combustible volatile matter remains unburned, the particles being heated at a rate in excess of 2000° F. (particle surface temperatures) per second; in the second stage, separating the solid expanded first-stage product from vaporous products at a temperature not less than that at which substantially all of said vaporous products remain in the vaporous state; and in the third stage, heating the solid particles from the second stage to remove residual volatile matter remaining on the surfaces of the particles to render them wettable, the final expanded product having a bulk density of less than about 25 lbs./cu. ft.

4. The process of claim 3 in which the third stage comprises heating the solid second-stage product in contact with oxidizing gases at a temperature sufficiently high to burn off the volatile matter remaining on the surfaces of the particles.

5. The process of claim 3 in which the third stage comprises contacting the solid second-stage product with a stream of inert gases at a temperature sufficiently high to distill off the volatile matter remaining on the surfaces of the particles.

6. A three-stage process for preparing a carbonaceous material from finely divided bituminous coal having a particle size of 75% −100 mesh and a volatile content of between about 15 to 20% by weight which comprises, in the first-stage flash-calcining the particles at a temperature between about 1150° to about 2000° F. in a gas stream containing oxygen in an amount between about 2.0 and about 4.0 standard cu. ft./lb. of bituminous particles so that at least 10% of the evolved combustible volatile matter remains unburned, the particles being heated at a rate in excess of 2000° F. (particle surface temperatures) per second; in the second stage, separating the solid expanded first-stage product from vaporous products at a temperature not less than that at which substantially all of said vaporous products remain in the vaporous state; and in the third stage, heating the solid particles from the second stage to remove residual volatile matter remaining on the surfaces of the particles to render them wettable, the final expanded product having a bulk density of less than about 25 lbs./cu. ft.

7. The process of claim 6 in which the amount of oxygen in the first stage is between about 2.2 and about 3.5 standard cubic feet per pound of coal.

8. The process of claim 6 in which the flash-calcining temperature is between about 1350° F. and about 1650° F.

9. A process according to claim 6 wherein, in the third stage, the solid particles from the second stage are conveyed in and by a gas stream containing oxygen in sufficient amount to burn substantially all of the residual volatile matter remaining on the surfaces of the particles.

References Cited in the file of this patent

UNITED STATES PATENTS

| | | |
|---|---|---|
| 2,407,268 | Goss | Sept. 10, 1946 |
| 2,636,688 | Singh | Apr. 28, 1953 |
| 2,706,706 | Pettyjohn | Apr. 19, 1955 |
| 2,723,226 | Lesher | Nov. 8, 1955 |